Jan. 5, 1965  B. E. PATON ETAL  3,164,712
WELDING HEAD FOR THE ELECTRICAL CONTACT WELDING OF LARGE
DIAMETER TUBES CIRCULAR (ANNULAR) JOINTS
Filed March 20, 1962

United States Patent Office 3,164,712
Patented Jan. 5, 1965

3,164,712
WELDING HEAD FOR THE ELECTRICAL CONTACT WELDING OF LARGE DIAMETER TUBES CIRCULAR (ANNULAR) JOINTS
Boris Evguenievich Paton, Vladimir Konstatinovich Lebedev, Nickolai Gerasimovich Ostapenko, Rafail Ivanovich Lashkevich, Platon Ivanovich Sevbo, Vasily Alexeevich Sakharnov, Mark Davydovich Litvinchuk, and Grigory Vasilievich Gorbunov, all of Kiev, U.S.S.R., assignors to Institute Elektrosvarki imeni E. O. Patona, Kiev, U.S.S.R.
Filed Mar. 20, 1962, Ser. No. 181,088
3 Claims. (Cl. 219—101)

The present invention relates to a welding head for electrical contact welding of circular joints on large diameter tubes.

In presently known welding heads an annular body opens in a diametrical plane and is mounted on the tube under work from the outside.

When large-diameter tubes are being welded, the dimensions and weight of such type welding heads reach excessively high values, thus rendering the welding process difficult and increasing the equipment costs.

For eliminating these shortcomings it is proposed to manufacture a circular welding head body consisting of two unopenable portions interconnected by a central rod and to support it on a self-propelled structure disposed within the internal space of the tubes to be welded.

The clamping contact shoes (cheeks) are in this case situated on the welding head body outer surface and are meant to clamp the tubes under work by expansion of the same from the inside.

For the purpose of simplifying the welding head construction the mechanism used for displacement of the clamping contact shoes (cheeks) includes an annular hydraulical cylinder with annular pistons which, by means of annular piston rods, are connected with circular cams having a conical outer surface interacting with bevelled bearing surfaces of the clamping shoes (cheeks).

For relative displacement of the tubes under work in an axial direction for providing contact and pressure at the weld joint an annular hydraulical cylinder is employed, the annular piston rod of which embraces the welding head body central rod.

For convenient use when welding tubes of considerable lengths, the hydraulic pump for actuating the hydraulic cylinders and the electric motor for driving the pump are mounted on the self-propelled structure together with the welding head body.

Figure 1:
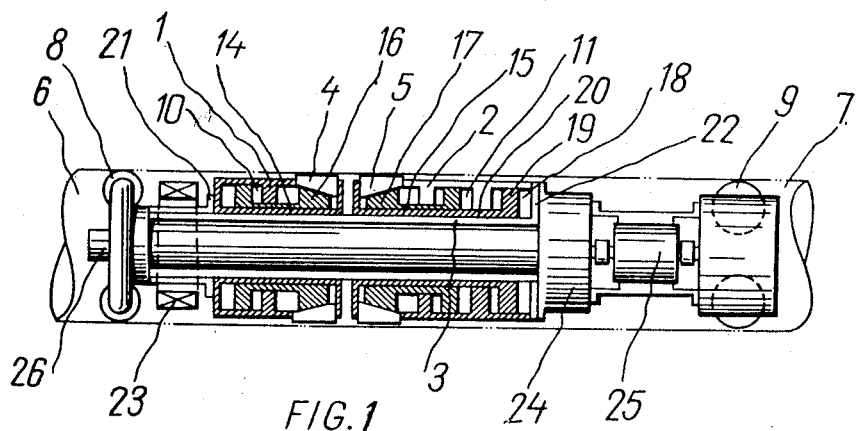
Figure 2:
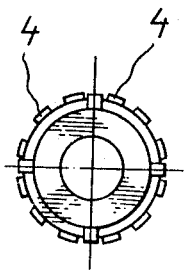

FIG. 1 represents a longitudinal section of the proposed welding head, and FIG. 2, a side view of the same.

Two portions 1 and 2 of the welding head annular body are interconnected by central rod 3. On the outer surface of each portion 1 and 2 clamping contact shoes (cheeks) 4 and 5 are located which are used for clamping of tubes 6 and 7 to be welded, by expansion of the shoes into engagement with the tube walls.

The welding head body is mounted by means of the central rod on a self-propelled structure provided with support rollers 8 and 9 for engaging the interior of the tubes 6 and 7.

Annular hydraulic cylinders 10 and 11 are connected by annular rods 14 and 15 to circular cams 16 and 17. The outer surface of the circular cams 16 and 17 has a conical shape and is in contact with the bevelled surfaces of the clamping and contact shoes 4 and 5. Annular hydraulic cylinder 18 together with annular piston 19 and annular piston rod 20 embrace central rod 3. Rod 20 is slidable with respect to the central rod 3.

Flanges 21 and 22 are immovable with respect to the central rod 3 and serve to limit movement of portions 1 and 2 of the welding head body away from each other. Welding transformer 23 is installed on the central rod 3. The secondary winding of the welding transformer (not shown on the drawing) is connected with the clamping contact shoes 4 and 5.

Hydraulic pump 24 and an electric drive motor 25 are mounted on the self-propelled structure together with the welding head body.

Hydraulic pump 24 is employed for actuating the hydraulic cylinders 10 and 11 which operate the clamping contact shoes, and also the hydraulic cylinder 18 for displacement of the tubes to be welded in an axial direction. Electric drive motor 25 serves to drive hydraulic pump 24 and also drives the self-propelled structure when the welding head is to be moved inside the tubes under work.

A flexible cable connected to the welding head by means of plug connection 26 is employed for power supply to the welding head. The operation of the welding head is carried out in the following way.

The welding head is installed with the aid of a lifting device into the interior of the tube to be welded. Electric drive motor 25 of the self-propelled structure is switched on and the welding head is moved inside the tube to the butt joint to be welded.

Next, hydraulic cylinders 10 and 11 are actuated, in such a way that cams 16 and 17 are displaced in the direction of the tube joint. At the same time the conical surfaces of the cams interacts with the bevelled surfaces of the clamping contact shoes (cheeks) 4 and 5 which are displaced in a radial direction to clamp the tubes under work by expansion from the inside.

Clamping of the tubes performed, the welding transformer, supplying current to clamping contact shoes (cheeks) 4 and 5 is switched on. At the same time a regulating device (not shown on the drawing) actuates hydraulic cylinder 18 for displacement of the tubes in axial direction.

After the edges of the tubes under work come into contact the welding current begins to flow and the welding process is started.

As melting of the edges goes on, the tubes approach each other at a low speed by actuation of cylinder 18; after sufficient heating has been achieved, the tubes are rapidly moved together to complete the welded joint.

Thereafter hydraulic cylinders 10 and 11 are actuated to move clamps 16 and 17 in the opposite direction to release shoes (cheeks) 4 and 5 from the welded tube.

The self-propelled structure is placed in operation and the welding head is moved inside the tube to the next tube joint to be welded.

The above described welding head is suitable for welding tubes with a diameter of 720 mm. and more. It serves to ensure a high work output, good quality of the weld joint and low equipment cost.

It will be obvious to those skilled in the art that various changes may be made in the invention without departing from the spirit and scope thereof and therefore the invention is not limited by that which is shown in the drawing and described in the specification, but only as indicated in the appended claims.

What we claim is:

1. A welding device for electrical contact resistance welding of butt joints between the ends of aligned tubes, said device comprising a self-propelled structure to be received within the tubes, driven rollers on said structure for engaging the inner walls of the tubes, a central rod mounted on said structure, a pair of axially spaced welding head portions slidably mounted on said rod, an expansible clamp on each head portion, means on each head portion for operating said clamp to engage the inner walls of the tubes at opposite sides of the joint to be welded, means on one head portion for moving said head portions toward and away from each other, a welding transformer mounted on said structure and connected to said clamps and a motor mounted on said structure for driving said rollers.

2. A device as defined in claim 1, in which the means for operating said clamps comprises an annular hydraulic cylinder on each head portion, an annular piston in each cylinder, an annular piston rod connected to each piston, a cam ring for each clamp connected to the associated piston rod and a pump mounted on said structure and driven by said motor for actuating said cylinders.

3. A device as defined in claim 2, in which the means for moving said head portions toward and away from each other comprises an additional annular hydraulic cylinder on one head portion, an annular piston in said additional cylinder and an annular piston rod connecting said last named piston and the other head portion, said additional cylinder being actuated by said pump.

References Cited by the Examiner
UNITED STATES PATENTS

| | | | |
|---|---|---|---|
| 2,013,630 | 9/35 | Goldsborough | 219—60 |
| 2,223,054 | 11/40 | Becker et al. | 219—66 XR |
| 2,344,939 | 3/44 | Bennett | 219—101 |
| 2,777,046 | 1/57 | Kocks | 219—161 |

RICHARD M. WOOD, *Primary Examiner.*

JOSEPH V. TRUHE, *Examiner.*